United States Patent [19]

Piret

[11] 3,741,038
[45] June 26, 1973

[54] TRANSMISSION MECHANISM HAVING AN AUTOMATIC GEAR CHANGE SYSTEM

[75] Inventor: Jean Piret, Bougival, France

[73] Assignee: Automobiles Peugeot, Paris, Regie Nationale Des Usines Renault, Billancourt, both of France

[22] Filed: July 1, 1971

[21] Appl. No.: 158,732

[30] Foreign Application Priority Data
July 30, 1970  France .................................. 7028140

[52] U.S. Cl. .................................................. 74/763
[51] Int. Cl. ............................................. F16h 57/10
[58] Field of Search ..................... 74/759, 761, 763, 74/765, 732

[56] References Cited
UNITED STATES PATENTS 3,554,057  1/1971  Michnay et al. ...................... 74/732
3,035,457  5/1962  Cartwright ............................ 74/763
3,049,945  8/1962  Lindsay ................................. 74/759
3,053,115  9/1962  Cartwright et al. ................... 74/763

Primary Examiner—Arthur T. McKeon
Assistant Examiner—Gregory LaPointe
Attorney—Burns, Doane, Swecker & Mathis

[57] ABSTRACT

Transmission mechanism having an automatic gear change system comprising an assembly of hydraulically controlled clutch and brake devices which include friction discs and hydraulic control cylinders supported by coaxial partly overlapping bell-shaped members whose concave sides face in the same axial direction. An end wall member has an outer periphery connected to rotate with the open end portion of the larger bell-shaped member and an inner periphery fixed to an element of a planetary gear train of the mechanism.

7 Claims, 2 Drawing Figures

TRANSMISSION MECHANISM HAVING AN AUTOMATIC GEAR CHANGE SYSTEM

The present invention relates to transmission mechanisms having an automatic gear change system, in particular for automobile vehicles.

Such mechanisms are known which are disposed between an output shaft and an input shaft and comprise a planetary gear train and hydraulically control brake and clutch devices whose selective actuation determines the value of the transmission or gear ratio of the mechanism. The present invention relates to such a mechanism specifically arranged in the following manner. The planetary gear train comprises two sun gears respectively integral with two coaxial shaft portions. The first of the sun gears is connected to the input shaft through a first clutch having friction discs, the second sun gear being rendered integral with an intermediate element capable of being connected through a second clutch to the input shaft and through a brake to the casing of the mechanism. Generally, the input shaft carries a bell-shaped member connected by splines to a series of discs of the first clutch and by other splines to a series of discs of the second clutch whereas said intermediate element is a second bell-shaped member fixed to the second shaft portion and connected by splines to the other series of discs of the second clutch and by other splines to a series of discs of the brake whose other series is integral with the casing. It should be mentioned that the expression "splines" must be understood to designate broadly any suitable means for interconnecting two members to rotate together while allowing axial movement therebetween. Each clutch device or brake device is actuated hydraulically by a piston and cylinder device preferably of annular shape, the cylinder and the actuating chamber of each clutch being defined by a portion of the corresponding bell-shaped member.

A more complete description of such a mechanism is given in the French Pat. Applns. No. 70 03 902 filed on Feb. 4, 1970, and 70 23 348 filed on June 24, 1970, filed by the Applicants. In these patents, the two bell-shaped members have their concave ends facing each other, the bell-shaped member of smaller diameter being integral with the input shaft. They generally have a U-shaped diametral section which results in a number of drawbacks:

The bell-shaped member of larger diameter has a roughly flat end wall which partly defines the receiving chamber for the hydraulic fluid controlling the second clutch and it has been found that it is imperfectly adapted to resist the pressure forces and liable to become deformed, which adversely affects the performance of the mechanism. Two arrangements which might be adopted for remedying this drawback and which consist either in decreasing the diameter of the outer bell-shaped member or imparting thereto a different shape more suitable for withstanding the forces due to the pressure, are not entirely satisfactory. The first-mentioned arrangement results in a decrease in the diameter of the clutch discs and consequently requires a greater number of discs for a given torque. The second arrangement results in a large increase in the axial size of the mechanism, which is unacceptable in the design of modern vehicles and in particular in vehicles having a transverse engine unit.

Another serious drawback of the aforementioned known mechanism results from the fact that the same intermediate element, namely the outer bell-shaped member, is subjected to, on one hand, as indicated hereinbefore, forces due to the presence of the hydraulic fluid under pressure, and, on the other hand, the forces due to the transmission of the torque, so that there results in the region of the connection by radial interengagement or splines of the bell-shaped member to the intermediate shaft portion, a composition of stresses which is particularly detrimental to the correct performance of the member.

An object of the invention is to remedy these various drawbacks.

The invention provides a transmission mechanism having an automatic gear change system comprising an input shaft, an output shaft, a planetary gear train, an assembly of hydraulically controlled clutch and brake devices, comprising two bell-shaped members acting as supports for friction discs and hydraulic control cylinders, said two members being coaxial and partly overlapping, wherein said two members have their concave sides facing in the same direction and there is provided an end wall member connected to rotate on its outer periphery with the open end of the bell-shaped member of larger diameter and on its inner periphery with an element of the planetary gear train.

With this arrangement it is possible, among other things, to give to the end portion of the outer bell-shaped member such shape as to enable it to resist the pressure forces, this shape being, for example, frusto-conical or stepped without increasing the axial overall size, since the bell-shaped member of smaller diameter or inner member is disposed entirely within the outer member. Further, there is a separation of the functions, since the forces due to the torque are transmitted essentially by the end wall member and no longer by the end wall portion of the bell-shaped member.

Further features and advantages of the invention will be apparent from the ensuing description with reference to the accompanying drawings.

In the drawings:

FIG. 1 shows a transmission mechanism having an automatic gear change system arranged in accordance with the invention. This mechanism will not be described in detail — only the parts thereof necessary for an understanding of the present invention will be described.

Figure 1:
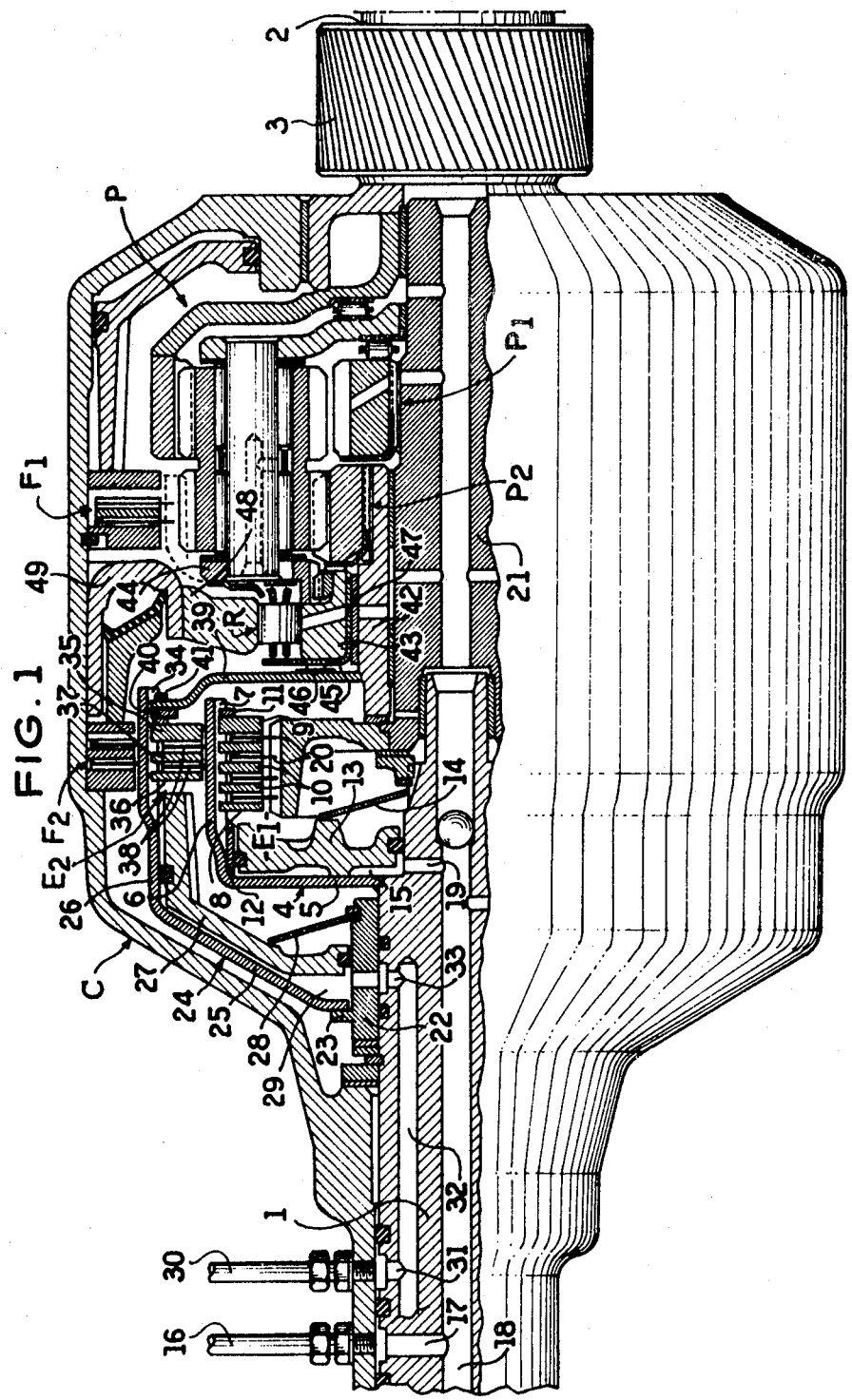
FIG. 1 is a side elevational view, partly in section, of an automatic gear change mechanism to which the invention is applied.

The mechanism is disposed in a casing C and comprises the following main sub-assemblies: an input shaft 1, an output shaft 2 carrying a pinion 3 adapted to mesh with a differential crownwheel (not shown), a planetary gear train P, two clutches $E_1$, $E_2$, two brakes $F_1$, $F_2$ and a free-wheel mechanism R.

Secured to the input shaft 1, for example by welding or electronic bombardment, is a bell-shaped member 4 more precisely having a U-shaped diametral section and comprising an end wall portions 5 and a lateral wall portion 6. Formed in the lateral wall 6 are inner splines 7 on which are mounted discs 10 disposed between two plates 8, 9. The discs 10 are discs of a first series of discs. These discs and plates are retained by a ring 11. A sleeve 12 attached to the lateral wall 6 in the vicinity of the end wall portion 5 defines a cylinder in which is slidably mounted a piston 13 which is axially guided by the shaft 1. A diaphragm spring 14 biases the piston 13 in a direction away from the plate 8. The bell-shaped member 4 and the piston 13 define a chamber 15 which can be supplied with fluid under pressure by way of a connection 16 and conduits 17, 18 and 19. A second series of discs 20, in alternating relation with discs 10, is connected to rotate with a lay shaft 21 carrying a first sun gear $P_1$ of the planetary gear train P. The assembly just described constitutes the clutch $E_1$.

The input shaft 1 is rotatably mounted in a sleeve 22 having an outer radial shoulder 23 to which is secured, for example by welding, a bell-shaped member 24. The latter practically surrounds the member 4 and has an end wall portion 25 which is roughly frusto-conical and a cylindrical lateral wall portion 26 which has slidably mounted therein a piston 27 which is axially guided by the sleeve 22 and biased by a diaphragm spring 28. This piston and the bell-shaped member 24 define a chamber 29 which is supplied with fluid under pressure by way of a connection 30 and conduits 31, 32 and 33. The cylindrical lateral wall portion 26 of the bell-shaped member 24 has splines 34 on which are mounted discs 37 disposed between two plates 35, 36. The discs 37 alternate with discs 38 which are connected to rotate with the inner bell-shaped member 4. This assembly constitutes the clutch $E_2$.

On the splined portion 34 of the bell-shaped member 24 there is also mounted an end wall member 39 of pressed sheet metal which is retained, in the same way as the plates 35, 36 and the discs 37, by a spacer member 40 and a ring 41. The end wall member 39 is welded on its inner periphery, for example by electronic bombardment, to a hollow shaft 42 which is rotatably mounted on the shaft 21 and carries a second sun gear $P_2$ of the planetary gear train P. It will be understood that the end wall member 39 can be connected to the shaft 42 in any manner, for example by splines.

It will be observed that the hub 43 of the free-wheel mechanism R is rotatably mounted on the hollow shaft 42. This hub is moreover connected by teeth means to the planet gear carrier 44 of the planetary gear train. A washer 45 carrying an element 46 having antifriction properties is connected by tabs 47 to the hub 43, the element 46 being in contact with the adjacent end wall member 39. The outer ring 48 of the free-wheel R is integral with an annular member 49 secured to the casing C.

It is unnecessary to describe in detail the operation of the mechanism which is conventional. However, owing to the particular arrangement of the bell-shaped members 4, 24, whose concave sides face in the same direction, particularly interesting results are obtained. Thus it is possible to give to the end wall portion 27 of the bell-shaped member 24 a frustoconical shape which imparts thereto an improved resistance to the forces created by the admission of fluid under pressure into the chamber 29 which precludes any deformation liable to affect the correct operation of the mechanism. Further, in the region of its connection to the sleeve 22, that is, on its inner periphery, the member 24 transmits no torque and no stress composition is produced in this region as in conventional arrangements. The torque transmitting force is supported by the end wall member 39 which has a shape specially designed therefor. The member 39, on the other hand, is subjected to no force of pressure. Each of the members 25, 39 can therefore be constructed in such manner as to afford the optimum resistance to a given type of force, which imparts a high operational reliability and a long life to the mechanism. This is achieved while retaining for the discs 37 and 38 a sufficient radial extent so that there is no need to increase the number of these discs and the axial overall size.

It will also be observed that the connections 16 and 30 are connected to the respective chambers 15 and 29 in a particularly simple manner by way of the input shaft 1.

Figure 2:
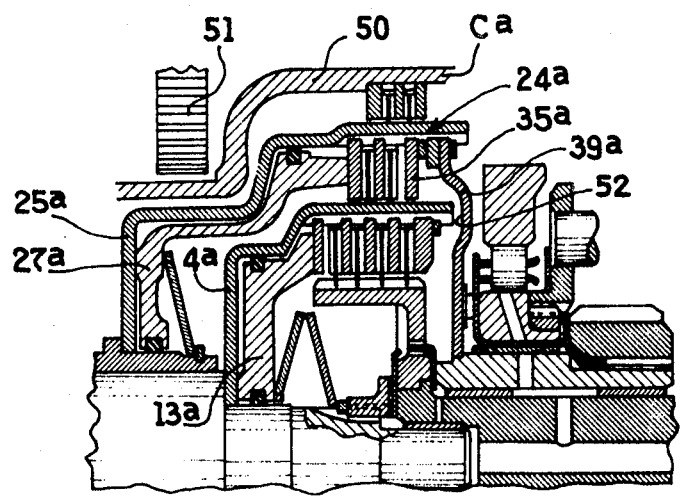
FIG. 2 is a partial sectional view of a modification of the mechanism according to the invention.

The embodiment shown in FIG. 2 differs from the embodiment shown in FIG. 1 only in respect of the shape of the inner bell-shaped member $4^a$ and outer bell-shaped member $24^a$ and the shape of the end wall member $39^a$ and the casing $C^a$. The members $4^a$ and $24^a$ have a stepped shape so as to permit the provision of a recess 50 in the casing to clear the starter gearwheel 51. The pistons $13^a$ and $27^a$ are correspondingly modified.

As concerns the end wall member $39^a$, it is of pressed metal and has a recess 52 into which extends the free edge of the bell-shaped member $4^a$. This enables the overall length of the mechanism to be slightly reduced.

As an additional modification, the end wall member 39 or $39^a$ may be connected to the bell-shaped member 24 by welding it to the plate 35 or $35^a$ instead of being retained by a ring as shown in the drawing.

It should be also mentioned that other modifications may be made in this mechanism without departing from the scope of the invention. In particular, the hub of the free-wheel R may be welded to the planet gear carrier of the planetary gear train. Further, this train may be of a type other than that illustrated.

Having now described my invention what I claim and desire to secure by Letters Patent is :

1. A transmission mechanism having an automatic gear change system, comprising a casing, and mounted in the casing : an input shaft, an output shaft, a planetary gear train having two sun gears, sets of planet gears carried on one planet carrier and one ring gear drivingly connected to the output shaft, an assembly of hydraulically controlled clutch and brake devices, which include two bell-shaped members and friction discs and hydraulic control cylinders supported by the bell-shaped members, said two members being in coaxial and in partly overlapping relation to each other, one of said members being larger than and outside the other member, said two members having concave sides facing in the same direction, the larger outer bell-shaped member having an inner wall portion remote from an open end portion and secured to a sleeve which is rotatably mounted on the input shaft, the inner bell-shaped member having an inner wall portion remote from said open end portion and secured to the input shaft, a hub member located inside said inner bell-shaped member and connected to rotate with an intermediate shaft having splined thereon a first of said sun gears, a hollow shaft rotatable on said intermediate shaft and having splined thereon a second of said sun gears, a free-wheel device located around said hollow shaft and in a space defined between said clutch and brake assembly and having a hub member rotatably mounted on said hollow shaft and connected to rotate with said planet carrier and an end wall member having an outer peripheral portion connected to rotate with said open end portion of the larger bell-shaped member and an inner peripheral portion connected to rotate with said hollow shaft.

2. A mechanism as claimed in claim 1, wherein the larger outer bell-shaped member has an end wall portion which is remote from said open end portion and has a frusto-conical shape.

3. A mechanism as claimed in claim 1, wherein the larger outer bell-shaped member has an end wall portion which is remote from said open end portion and has a stepped shape, the casing having a shape similar to the stepped shape so as to permit clearing an element outside the casing.

4. A mechanism as claimed in claim 1, 1, wherein the freewheel device hub is combined with an antifriction element which is in contact with an adjacent face of the end wall member.

5. A mechanism as claimed in claim 1, wherein the end wall member has notching on said outer peripheral portion engaged with splines on the larger outer bell-shaped member and retained by a resiliently yieldable ring.

6. A mechanism as claimed in claim 1, wherein the outer peripheral portion of the end wall member is welded to a clutch plate which is connected to rotate with the larger outer bell-shaped member.

7. A mechanism as claimed in claim 4, wherein the end wall member is of pressed sheet metal and has an axially offset portion into which an outer edge of said other bell-shaped member extends.

* * * * *